United States Patent [19]
Bryan et al.

[11] Patent Number: 5,801,901
[45] Date of Patent: Sep. 1, 1998

[54] DISC DRIVE CLAMP FASTENER INCLUDING A CLAMP DISC INDENTATION

[75] Inventors: William J. Bryan, Boulder; Richard K. Thompson, Berthond, both of Colo.

[73] Assignee: Seagate Technology, Inc., Scotts Valley, Calif.

[21] Appl. No.: 646,883

[22] Filed: May 8, 1996

[51] Int. Cl.⁶ .................................................. G11B 17/08
[52] U.S. Cl. ........................... 360/98.08; 360/99.12
[58] Field of Search ................. 360/98.07, 98.08, 360/99.04, 99.05, 106; 369/258, 270, 271

[56] References Cited

U.S. PATENT DOCUMENTS

| | | |
|---|---|---|
| 5,014,142 | 5/1991 | Nakanishi et al. . |
| 5,027,242 | 6/1991 | Nishida et al. . |
| 5,363,262 | 11/1994 | Drennan ............... 360/106 |
| 5,392,178 | 2/1995 | Nishio et al. ......... 360/98.08 |
| 5,404,636 | 4/1995 | Stefansky et al. . |
| 5,422,768 | 6/1995 | Roehling et al. ...... 360/98.08 |
| 5,497,281 | 3/1996 | Jewell et al. .......... 360/98.08 |
| 5,517,374 | 5/1996 | Katakura et al. ...... 360/98.08 |
| 5,517,376 | 5/1996 | Green .................... 360/98.08 |
| 5,532,889 | 7/1996 | Stefansky et al. ..... 360/106 |

FOREIGN PATENT DOCUMENTS

| | | |
|---|---|---|
| 93300559 | 1/1993 | European Pat. Off. . |
| 4-311892 | 11/1992 | Japan ................... 360/98.08 |

OTHER PUBLICATIONS

IBM Technical Disclosure Bulletin vol. 24, No. 6; Reidenbach; "Method Disk File Disk Clamping", Nov. 1981.

*Primary Examiner*—Jefferson Evans
*Attorney, Agent, or Firm*—Bill D. McCarthy; Edward P. Heller, III; Randall K. McCarthy

[57] ABSTRACT

Apparatus for clamping a plurality of axially spaced, rotatable elements such as a stack of actuator arms or magnetic storage discs in a disc drive. The rotatable elements are coupled to respective housings for rotation at a respective radius about associated, stationary shafts by bearing assemblies. As used in an actuator assembly, an actuator shaft bearing housing is inserted into an opening in each of the actuator arms and a clamp fastener exerts a clamping force on the actuator arms so as to secure the actuator arms relative to the actuator shaft bearing housing. The clamp fastener comprises a clamp fastener cylinder with an exterior surface which is fixably attached to a corresponding interior surface of the actuator shaft bearing housing. The clamping force is exerted by a clamp disc protruding in a radial direction from the clamp fastener cylinder, beyond the radius of the actuator shaft bearing housing. The clamp fastener can be used in a similar fashion to clamp a stack of magnetic storage discs in place around a spindle motor housing.

27 Claims, 4 Drawing Sheets

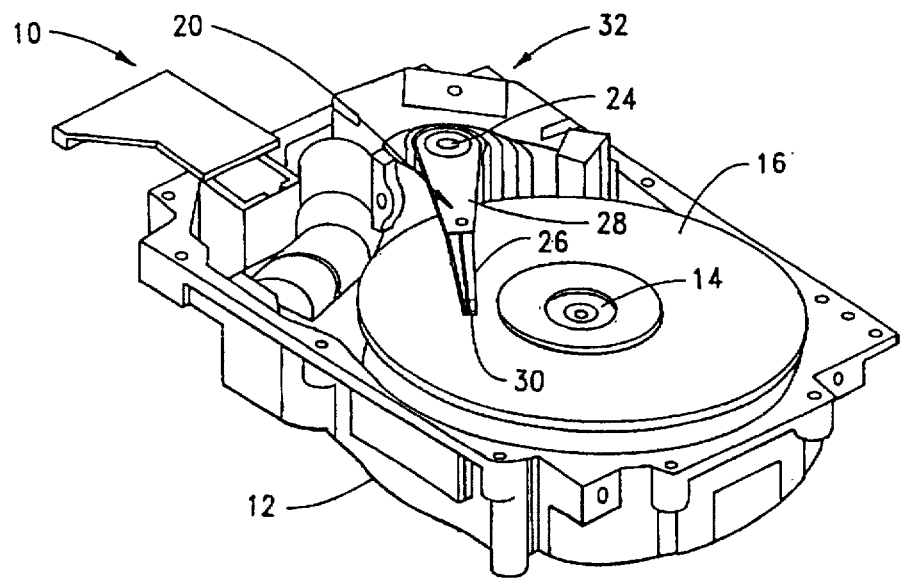
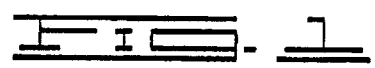
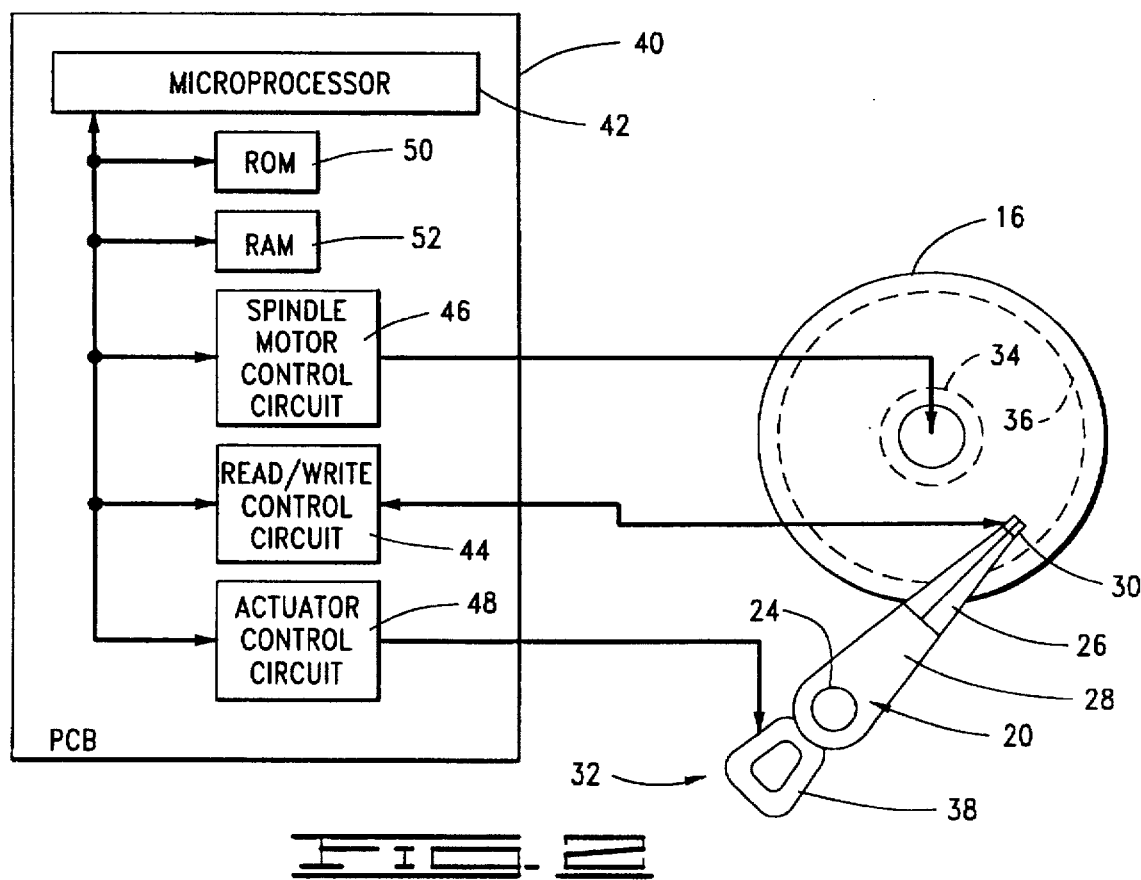
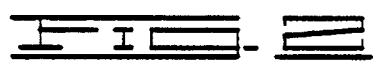

DISC DRIVE CLAMP FASTENER INCLUDING A CLAMP DISC INDENTATION

BACKGROUND OF THE INVENTION

1. Field of the Invention

This invention relates generally to the field of disc drive data storage devices, and more particularly, but not by way of limitation, to a clamp fastener for clamping axially spaced, rotatable disc drive elements such as disc drive actuator arms and magnetic storage discs.

2. Discussion

Disc drives are commonly used in workstations, personal computers, laptops and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extends generally circumferentially around the discs and store data in the form of magnetic flux transitions within the radial extent of the tracks on the disc surfaces. Typically, each data track is divided into a number of data sectors that store fixed sized data blocks.

A head includes an interactive element such as a magnetic transducer which senses the magnetic transitions on a selected data track to read the data stored on the track, or to transmit an electrical signal that induces magnetic transitions on the selected data track to write data to the track. The magnetic transducer includes a read/write gap that positions the active elements of the transducer at a position suitable for interaction with the magnetic transitions on the data tracks of a disc as the disc rotates.

As is known in the art, each head is mounted to a rotary actuator arm (by way of a flexure element) and is selectively positionable by the actuator arm over a preselected data track of the disc to either read data from or write data to the preselected data track. The head structure includes a slider assembly having an air bearing surface that causes the transducer to fly over the data tracks of the disc surface due to fluid air currents caused by rotation of the disc.

Typically, several discs are stacked on top of each other and the surfaces of the stacked discs are accessed by the heads mounted on a complementary stack of actuator arms. As is known in the prior art, the stack of actuator arms can be clamped by a pair of nut and bolt assemblies, as disclosed in U.S. Pat. No. 5,404,636 entitled METHOD OF ASSEMBLING A DISK DRIVE ACTUATOR, issued Apr. 11, 1995 to Stefansky et al. Additionally, the stack of actuator arms can be clamped using a "bear hug nut" attached to a bearing cartridge with external threads, such as disclosed in published European Patent Application No. 93300559.7 entitled DIRECTLY WELDED LOAD BEAM FLEXURE ASSEMBLY, filed Jan. 27, 1993 by Jabbari et al. Both of these references are assigned to the assignee of the present invention and are incorporated herein by reference.

Another well known prior art method used to attach actuator arms and discs to a rotating shaft is through the use of a swaging technique, which involves running a small ball through the shaft to expand it slightly in order to couple the actuator arms or discs in place.

Several disadvantages, however, have been associated with the prior art. For example, in the nut and bolt assemblies referenced hereinabove, the protrusion of the nut adds to the profile height of the actuator arm assembly. Also, the distribution of force is dependent on the perpendicularity of the nut's control surface with respect to the threads of the bearing housing. Additionally, the clamping force exerted by the nut is highly dependent upon fastener torque, which in turn depends upon thread quality and friction, which are difficult and expensive to control to the desired tolerances necessary in the large scale manufacturing of disc drives. Further, the use of swaging techniques can distort the assembled stack slightly, which decreases head performance.

As a result of these and other disadvantages with the prior art, there is a need for an improved approach to couple actuator arms and discs, respectively, to corresponding actuator and disc bearing housings.

SUMMARY OF THE INVENTION

The present invention provides an apparatus for clamping a stack of axially spaced, rotatable disc drive elements such as actuator arms or magnetic storage discs using a clamp fastener that engages the interior surface of a corresponding bearing housing. The rotatable elements are coupled to respective housings for rotation at a respective radius about associated, stationary shafts by bearing assemblies and are secured by flanges extending from the clamp fastener.

As used in an actuator assembly, an actuator shaft bearing housing is inserted into an opening in each of the actuator arms and a clamp fastener exerts a clamping force on the actuator arms so as to secure the actuator arms relative to the actuator shaft bearing housing. The clamping force is exerted by a clamp disc protruding in a radial direction from the clamp fastener cylinder, beyond the radius of the actuator shaft bearing housing. The clamp fastener comprises a clamp fastener cylinder with an exterior surface which is fixably attached to a corresponding interior surface of the actuator shaft bearing housing. The clamp fastener is used in a similar fashion to clamp a stack of magnetic storage discs in place around a spindle motor housing.

The use of the clamp fastener minimizes the protrusion of external fasteners by allowing screw threads between the clamp fastener and the bearing assembly to coexist in the same position along the axial dimension of the bearing assembly as some of the individually stacked actuator arms. In addition, the use of a compliant flange protruding from the clamp fastener allows the clamping force in the stack to be controlled generally independently of the fastener torque. The compliant flange maintains a clamping force within prescribed limits over a range of part thickness variations and changes in thickness due to thermal expansion. The compliant flange also distributes the clamping force in a generally even manner through the stack, minimizing distortion in the stacked actuator arm or disc assembly.

An object of the present invention is to provide improved clamping of actuator arms and discs in a disc drive assembly.

Another object of the present invention is to maintain the clamping force on the actuator arms and discs within prescribed limits, accommodating variations in part thicknesses and the effects of thermal expansion.

Still another object of the present invention is to provide the required clamping of the actuator arms and discs in an easily manufacturable, inexpensive manner.

Yet another object of the present invention is to clamp the actuator arms and discs such that the clamping force is distributed in a generally even manner among the respective actuator arms and discs.

Other objects, advantages and features of the present invention will be apparent from the following description when read in conjunction with the drawings and appended claims.

BRIEF DESCRIPTION OF THE DRAWINGS

FIG. 1 is a perspective view of a disc drive in which the present invention is particularly useful.

FIG. 2 is a functional block diagram of the disc drive of FIG. 1.

DETAILED DESCRIPTION OF THE PREFERRED EMBODIMENT

Figure 3:
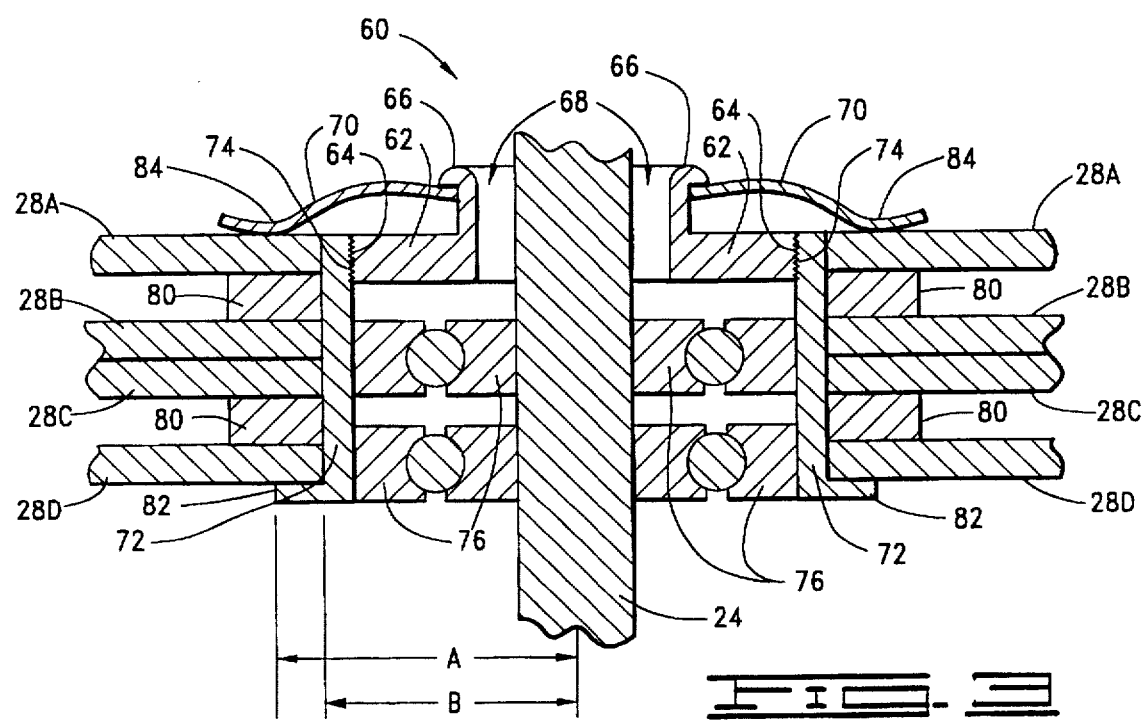
FIG. 3 is a general cross-section of a first embodiment of the clamp fastener of the present invention in conjunction with a stack of actuator arms.

Turning now to the drawings and more particularly to FIG. 1 shown therein is a perspective view of a disc drive 10 of the present invention. The disc drive 10 includes a housing base 12 and a top cover (not shown) which cooperatively engage to form a sealed housing which serves to protect delicate internal components from external contaminants.

A plurality of discs 16 are mounted to a spindle motor (shown generally at 14) for rotation at a constant high speed. An array of heads (one shown at 30) is mounted to an actuator assembly 20 by way of flexures 26 which are attached to actuator arms 28. The actuator assembly 20 is adapted for pivotal motion about an actuator shaft 24 under control of a voice coil motor (VCM), shown generally at 32. The VCM 32 is driven by a servo control circuit (not shown in FIG. 1) to controllably move the heads 30 to any desired one of a plurality of concentric circular tracks (not shown) on the discs 16.

The heads 30 are electrically coupled to a preamplifier circuit (not shown) so that, during a disc drive read operation, electrical signals induced in the heads 30 from the magnetic flux transitions on the disc surface are processed by the preamplifier circuit and then transmitted to read/write channel circuitry (not shown) in the disc drive for subsequent transmission to a host computer (not shown). During a write operation, electrical signals representative of data are received by the read/write channel from the host computer for transmission to the preamplifier. The preamplifier includes a write driver which transmits signals to the heads 30, which in turn selectively magnetize portions of selected data tracks to write the data to the discs 16.

Each of the heads 30 is mounted to one of the corresponding actuator arms 28 by way of the flexures 26 and includes a magnetic transducer mounted on a slider having an air bearing surface, all in a known manner. As is typically utilized in disc drive systems, the sliders cause the heads 30 to "fly" above the surfaces of the respective surfaces of the discs 16 for non-contact operation of the disc drive system, as discussed above. When not in use, the VCM 32 rotates the actuator arms 28 during a contact stop operation to position the heads 30 over respective landing zones (34 or 36, as shown in FIG. 2), where the heads 30 come to rest on the surfaces of the discs 16. As will be recognized, each head 30 is typically at rest on a respective landing zone 34 or 36 at the commencement of a contact start operation.

A printed circuit board (PCB, not shown in FIG. 1) is provided to mount control electronics for controlled operation of the spindle motor 14 and the VCM 32. The PCB also includes the read/write channel circuitry discussed hereinabove which is coupled to the heads 30 by way of the preamplifier, to control the transfer of data to and from the data tracks of the discs 16. The manner of coupling the PCB to the various components of the disc drive is well known and is discussed in more detail with reference to FIG. 2.

Referring now to FIG. 2, shown therein in a generalized schematic form is the PCB (generally denoted as 40) and the electrical couplings between the control electronics on the PCB 40 and the components of the disc drive described hereinabove. A microprocessor 42 is shown to be electrically coupled to each of a read/write control circuit 44, a spindle motor control circuit 46, an actuator control circuit 48, ROM 50 and RAM 52. In modern disc drive designs, the microprocessor 42 can comprise a digital signal processor (DSP). Generally, the microprocessor 42 operates to send data to and receive data from the discs 16 by way of the read/write control circuit 44 and the heads 30. Additionally, the microprocessor 42 operates according to instructions stored in ROM 50 to generate and transmit control signals to the spindle motor control circuit 46 and the actuator control circuit 48.

The spindle motor control circuit 46 is responsive to control signals received from the microprocessor 42 to generate and transmit a drive voltage to the spindle motor 14 to cause the discs 16 to rotate at an appropriate rotational velocity.

Similarly, the actuator control circuit 48 is responsive to control signals received from the microprocessor 42 to generate and transmit a voltage to a coil 38 of the VCM 32 to controllably rotate the heads 30 to preselected radial positions over the discs 16. The magnitude and polarity of the voltage generated by the actuator control circuit 48, as a function of the microprocessor control signals, determines the radial direction and speed of the heads 30.

When data to be written or read from one of the discs 16 are stored on a data track different from the current radial position of the heads 30, the microprocessor 42 determines the current radial position of the heads 30 and the radial position of the data track where the heads 30 are to be relocated. The microprocessor 42 then implements a seek operation wherein the control signals generated by the microprocessor 42 for the actuator control circuit 48 cause the VCM 32 to move the heads 30 from the current data track to a destination data track at the desired radial position.

When the actuator has moved the heads 30 to the destination data track, a multiplexer (not shown) is used to couple the particular head over the destination track to the read/write control circuit 44 as is generally known in the art. The read/write control circuit 44 includes a read channel that, in accordance with modern disc drive design, comprises an electronic circuit that detects information represented by magnetic transitions recorded on the disc surface within the radial extent of the selected data track.

Finally, the RAM 52 can be used to buffer data read from or to be written to the data sectors of the discs 16. The buffered data can be transferred to or from the host computer utilizing the disc drive for data storage.

Having concluded an overview of the disc drive 10, reference is now made to FIG. 3 which shows a cross-sectional view of a first embodiment for a clamp fastener 60 of the present invention, operably connected to the actuator assembly 20 of FIGS. 1 and 2. More particularly, FIG. 3 shows the clamp fastener 60 to comprise a clamp fastener cylinder 62, external screw threads 64, a clamp fastener lip 66, a torque driver hole 68 and a clamp disc 70. The external screw threads 64 of the clamp fastener cylinder 62 are mated with internal screw threads 74 cut into an actuator shaft bearing housing 72, as shown. The actuator shaft bearing housing 72 houses bearings 76 such that the actuator shaft bearing housing 72 can rotate relative to the actuator shaft 24 in a conventional manner. It will be recognized that the rotation of the actuator shaft bearing housing 72 is controlled by the VCM 32, as provided hereinabove. It will further be recognized that the axial extent and configuration of the actuator shaft 24 is dependent upon the corresponding configuration of the disc drive 10.

Additionally, FIG. 3 shows the actuator arms (individually denoted as 28A–D) and spacers 80 fit around the actuator shaft bearing housing 72 and are held in place in the axial direction of the actuator shaft bearing housing 72 by the clamp disc 70 and a lip 82 of the actuator shaft bearing housing 72. The clamp disc 70 is preferably coined from a beryllium-copper alloy or other suitable spring material. Further, the clamp disc 70 includes an indentation 84, wherein the lowest point of the indentation occurs at a radius "A" which is larger than a radius "B" of the actuator shaft bearing housing 72, such that the indentation 84 protrudes past the actuator shaft bearing housing 72 and contacts the top actuator arm 28A, providing a downward clamping force.

Figure 4:
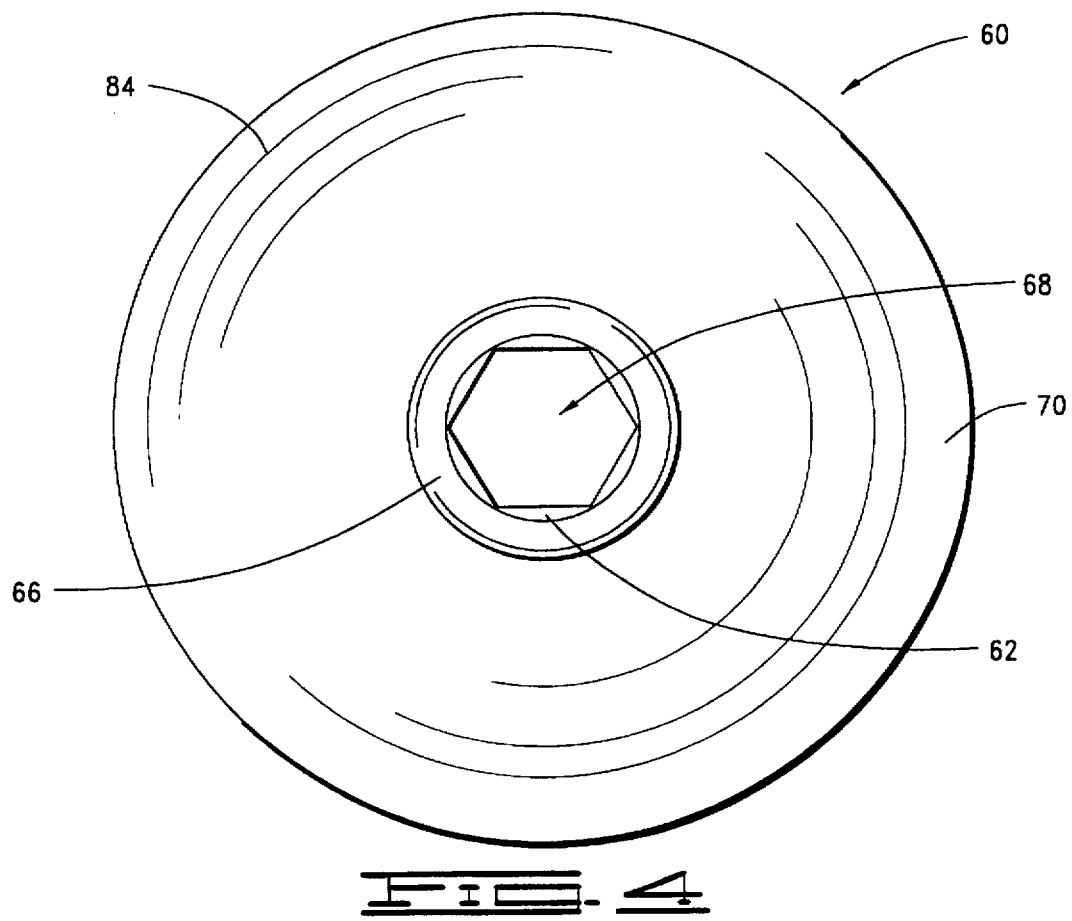
FIG. 4 is a top plan view of the clamp fastener embodiment of FIG. 3.

Referring now to FIG. 4, shown therein is a top plan view of the clamp fastener 60 of FIG. 3, illustrating the clamp fastener cylinder 62, the clamp fastener lip 66, the torque driver hole 68 and the clamp disc 70. The torque driver hole 68 is preferably hex or spline shaped to accommodate the insertion and use of a torque driver (not shown) during installation of the clamp fastener 60, although it will be recognized that any other shape suitable for a torque driver can readily be used. It is contemplated that sufficient clearance will exist between the clamp fastener cylinder 62 and the actuator shaft 24 (of FIG. 3) to enable the torque driver to be inserted into the torque driver hole 68 for installation of the clamp fastener 60; further it is contemplated that the spring force generated by the clamp disc 70 (at the indentation 84) once the clamp fastener 60 is installed will be sufficient to secure the clamp fastener 60 in place. The clamp disc 70 protrudes from the clamp fastener cylinder 62 as shown and is secured by the clamp fastener lip 66. For additional detail, FIG. 5 provides an isometric view of the clamp fastener 60 of FIGS. 3 and 4.

Figure 5:
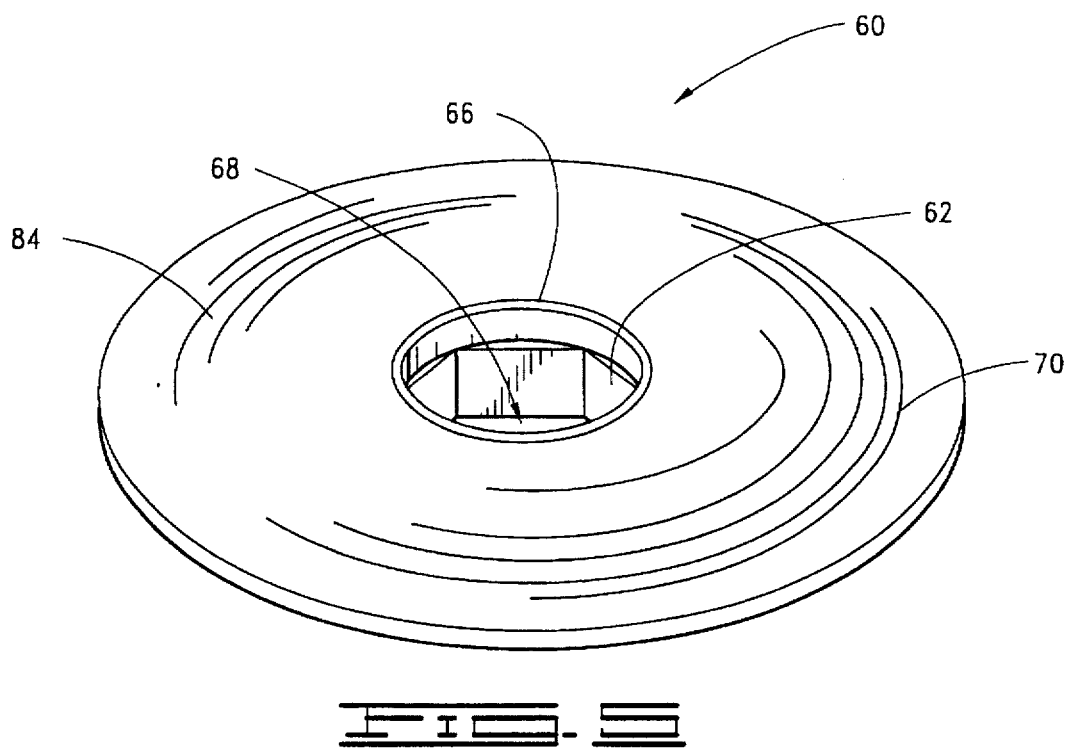
FIG. 5 is a general isometric view of the clamp fastener embodiment of FIGS. 3 and 4.
Figure 6:
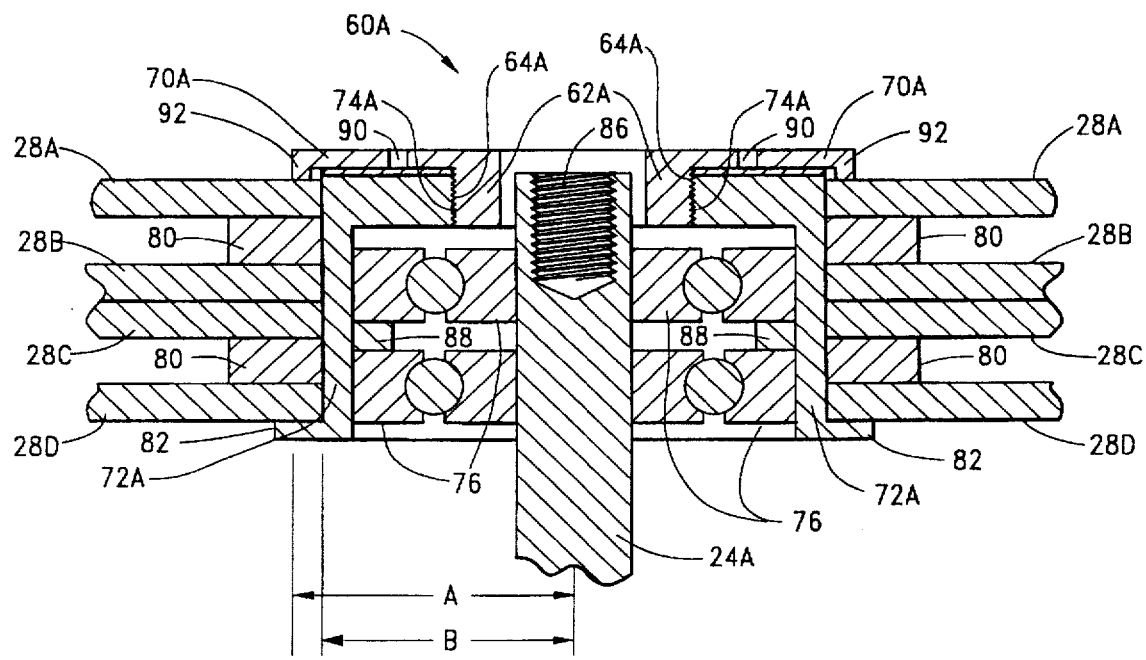
FIG. 6 is a general cross-section of a second embodiment of the clamp fastener of the present invention in conjunction with a stack of actuator arms.

Turning to FIG. 6, shown therein is a second embodiment of the clamp fastener (denoted therein as "60A") having a construction similar to the clamp fastener 60 of FIGS. 3–5. More particularly, FIG. 6 provides a cross-sectional view of the clamp fastener 60A in conjunction with the actuator assembly 20, with the clamp fastener 60A including a clamp fastener cylinder 62A having external screw threads 64A which mate with internal screw threads 74A of an actuator shaft bearing housing 72A. As before, the bearings 76 rotatably mount the actuator shaft bearing housing 72A to a shaft 24A.

For purposes of clarity, the shaft 24A in FIG. 6 has been illustrated with a conventional threaded portion 86 corresponding to disc drive hardware (not shown) used to secure the shaft 24A of the disc drive structure. Again, it will be recognized that the configuration of the shaft 24A shown in FIG. 6 is not germane to the present invention except to the extent of the general radial alignment of the shaft 24A to the clamp fastener 60A and the bearings 76, as shown. Additionally, a bearing spacer 88 axially separates the bearings 76 in a conventional manner.

Figure 7:
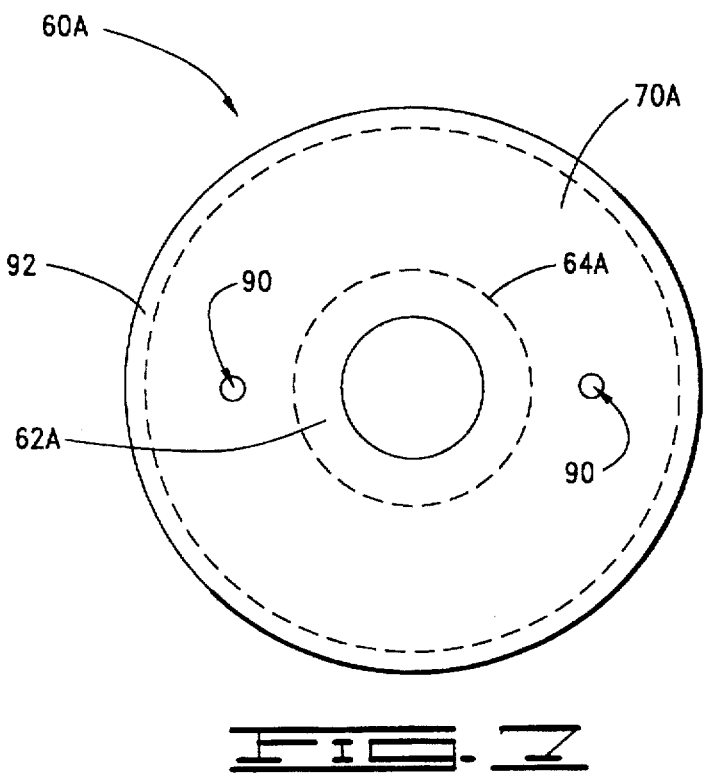
FIG. 7 is a top plan view of the clamp fastener embodiment of FIG. 6.

Continuing with FIG. 6, it will be recognized that in the embodiment presented therein a clamp disc 70A is integral with the clamp fastener cylinder 62A and is constructed from a single piece of material. Torque is applied to the clamp fastener 60A during assembly through spanner holes 90 by way of an appropriate spanner tool (not shown). A clamp disc step 92 protrudes from the clamp disc 70A having a radius at a distance "A" which is greater than an outer radius "B" of the actuator shaft bearing housing 72A, so that the clamp disc step 92 clears the actuator shaft bearing housing 72A and contacts the top actuator arm 28A when the clamp fastener 60A is tightened into the actuator shaft bearing housing 72A. It is contemplated that an additional spacer (not shown) placed on top of the top actuator arm 28A could be used instead of, or in addition to, the clamp disc step 92. The height of the clamp disc step 92 can be varied accordingly to adjust the preload force against the actuator arms 28A–D. For reference, FIG. 7 provides a top plan view of the clamp fastener 60A of FIG. 6.

As provided hereinabove, the clamp fastener of the present invention can be used to clamp both the actuator arms 28 as well as the discs 16 of the disc drive 10. For purposes of illustration, FIG. 8 has been provided which illustrates the clamp fastener 60 of FIG. 3 clamping a stack of the discs 16 (denoted therein at 16A, 16B).

Figure 8:
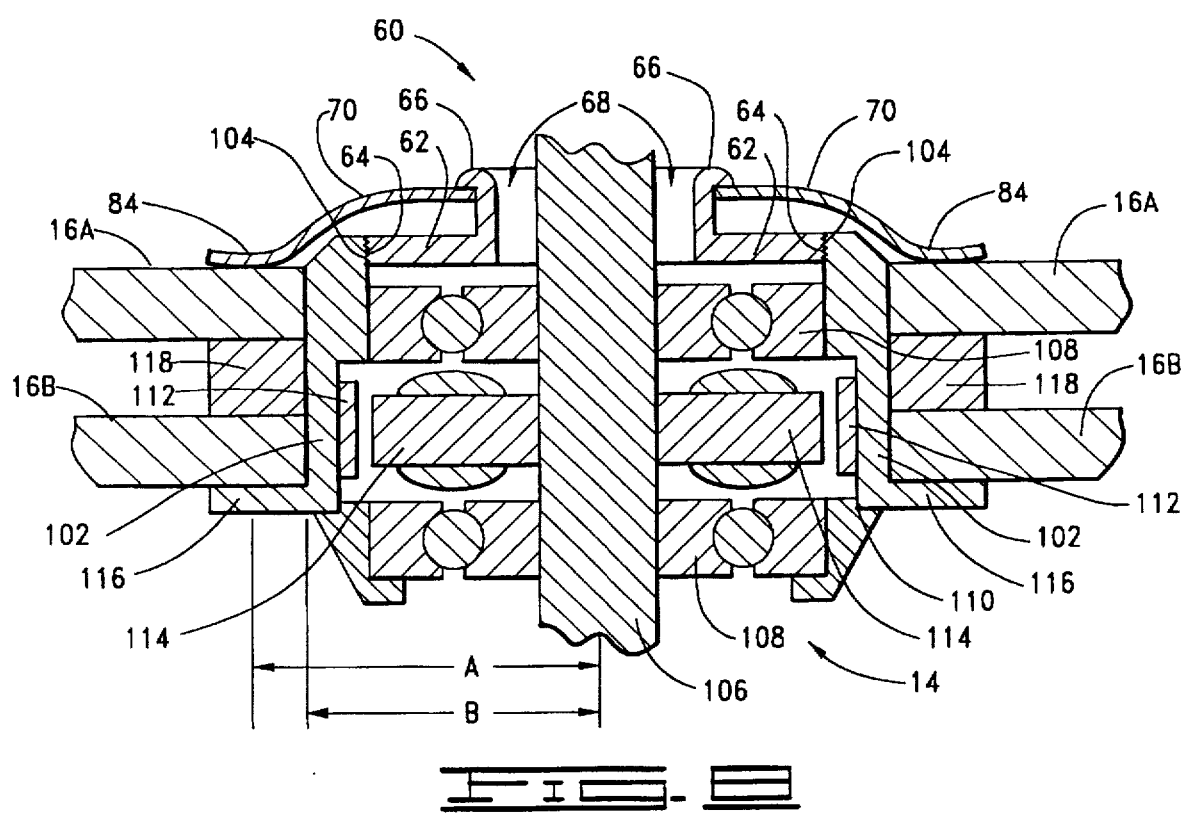
FIG. 8 is a general cross-section of the clamp fastener embodiment of FIGS. 3, 4 and 5 in conjunction with a stack of discs.

More particularly, FIG. 8 shows the clamp fastener 60 to include the clamp fastener cylinder 62, the external screw threads 64, the clamp fastener lip 66, the torque driver hole 68 and the clamp disc 70, as previously described with reference to FIG. 3. The clamp fastener 60 is fixed to a spindle motor hub 102 (hereinafter also sometimes referred to as a "spindle motor housing") of the spindle motor 14 by way of the external screw threads 64 of the clamp fastener 60 and internal screw threads 104 of the spindle motor hub 102. The hub 102 is mounted for rotation about a stationary shaft 106 of the spindle motor 14 by way of bearings 108 and a spacer 110. Additionally, it will be recognized that the hub 102 is rotated as a result of magnetic interaction between the magnetic fields of permanent magnets (two shown at 112) and coil assemblies (two shown at 114) in a conventional manner.

A lip 116 of the spindle motor hub 102 is provided to support the discs 16A, 16B and a disc spacer 118 axially aligns the discs as shown. The indentation 84 of the clamp disc 70 provides a downward clamping force upon the top disc 16A at a radius "A" which is greater than a radius "B" of the spindle motor hub 102. As with the clamp fastener 60 of FIG. 3, the indentation 84 of the clamp disc 70 in FIG. 8 holds the stack of discs 16A, 16B and the disc spacer 118 in place.

It will be clear that the present invention is well adapted to carry out the objects and attain the ends and advantages mentioned as well as those inherent therein. While presently preferred embodiments have been described for purpose of this disclosure, numerous changes may be made which will readily suggest themselves to those skilled in the art and which are encompassed in the spirit of the invention disclosed and as defined in the appended claims.

What is claimed is:

1. In a disc drive of the type having a plurality of axially spaced, rotatable elements including actuator arms and discs, the disc drive including a spindle motor and associated spindle motor control circuitry for rotating the discs at a constant rotational velocity and a voice coil motor and associated actuator control circuitry for selectively positioning the actuator arms radially with respect to the discs, the discs including a plurality of nominally concentric data tracks for the storage and retrieval of data by heads attached to respective actuator arms by way of flexure elements, the rotatable elements coupled to respective housings coupled for rotation at a respective radiuses about associated, stationary shafts by bearing means, the improvement comprising:

a clamp fastener for axially clamping selected rotatable elements of the disc drive comprising:

a clamp fastener cylinder including coupling means for providing cylindrical coupling to the housing within the axial extent of the housing; and clamp disc means, connected to the clamp fastener cylinder, for clamping the selected rotatable elements, the clamp disc means including a compliant flange extending from the clamp fastener cylinder with an indentation at a radius greater than the radius of the housing such that said compliant flange does not contact the housing, the indentation clamping the rotatable elements.

2. The improvement of claim 1, wherein the coupling means comprises screw threads which rotatably engage with corresponding screw threads of the housing.

3. The improvement of claim 1, wherein the clamp fastener cylinder allows access to the stationary shaft for attachment of disc drive hardware to the shaft.

4. An actuator assembly for a disc drive, comprising:

an actuator shaft;

an actuator shaft bearing housing mounted to the actuator shaft such that the actuator shaft bearing housing is capable of rotation around the actuator shaft;

a plurality of actuator arms coupled to the actuator shaft bearing housing such that the actuator shaft bearing housing is inserted into an opening in each of the actuator arms whereby the actuator arms are stacked around the actuator shaft bearing housing;

a clamp fastener cylinder coupled to the actuator shaft bearing housing; and a clamp disc protruding in a radial direction from the clamp fastener cylinder, the clamp disc including an indentation at a radius beyond the radius of the spindle motor hub such that the clamp disc does not contact the spindle motor hub and wherein an exterior surface of the clamp fastener cylinder is attached to an interior surface of the actuator shaft bearing housing sufficiently to exert a clamping force, via the indentation, onto the plurality of actuator arms, the clamping force holding the plurality of actuator arms against the actuator shaft housing.

5. The actuator assembly of claim 4, wherein the clamp fastener cylinder is attached to the actuator cartridge housing by complementary screw threads located in the interior surface of the actuator shaft bearing housing and the exterior surface of the clamp fastener cylinder.

6. The actuator assembly of claim 5, wherein the clamp fastener cylinder is characterized as having a torque driver hole to accommodate a torque driver for the application of torque to the clamp fastener cylinder during assembly.

7. The actuator assembly of claim 4, wherein the clamp disc is characterized as a spring.

8. The actuator assembly of claim 4, wherein the clamp fastener cylinder includes a lip protruding from the clamp fastener cylinder such that the clamp disc is fixed to the clamp fastener cylinder by the lip.

9. The actuator assembly of claim 4, wherein at least one actuator arm is separated from an adjacent actuator arm by a spacer.

10. A disc assembly for a disc drive, comprising:

a stationary shaft;

a spindle motor mounted to the stationary shaft;

a spindle motor hub mounted to the spindle motor such that the spindle motor hub is capable of rotation around the spindle motor;

a plurality of discs coupled to the spindle motor hub such that the spindle motor hub is inserted into an opening in each of the discs whereby the discs are axially stacked around the spindle motor hub;

a clamp fastener cylinder coupled to the spindle motor hub; and a clamp disc protruding in a radial direction from the clamp fastener cylinder, the clamp disc including a indentation at a radius beyond the radius of the spindle motor hub such that the clamp disc does not contact the spindle motor hub and wherein an exterior surface of the clamp fastener cylinder is attached to an interior surface of the spindle motor hub sufficiently to exert a clamping force, via the indentation, onto the plurality of discs, the clamping force holding the plurality of discs against the spindle motor hub.

11. The disc assembly of claim 10, wherein the clamp fastener cylinder is attached to the spindle motor hub by complementary screw threads located in the interior surface of the spindle motor hub and the exterior surface of the clamp fastener cylinder.

12. The disc assembly of claim 11, wherein the clamp fastener cylinder is characterized as having a torque driver hole to accommodate a torque driver for the application of torque to the clamp fastener cylinder during assembly.

13. The disc assembly of claim 10, wherein the clamp disc is characterized as a spring.

14. The disc assembly of claim 10, wherein the clamp fastener cylinder includes a lip protruding from the clamp fastener cylinder such that the clamp disc is fixed to the clamp fastener cylinder by the lip.

15. The disc assembly of claim 10, wherein at least one disc is separated from an adjacent disc by a spacer.

16. The disc assembly of claim 10, wherein the clamp fastener cylinder allows access to the stationary shaft for attachment of disc drive hardware to the shaft.

17. A disc drive rotatable assembly, comprising:

a stationary shaft;

a rotatable housing mounted to the stationary shaft by way of bearing means, so that the rotatable housing is capable of rotation about the stationary shaft;

a plurality of radially extending members coupled to the rotatable housing such that the rotatable housing is inserted into an opening in each of the members whereby the members are stacked around the rotatable housing;

a clamp fastener coupled to the rotatable housing and the members, the clamp fastener comprising:

a clamp fastener cylinder coupled to the rotatable housing within the axial extent of the rotatable housing; and a clamp disc protruding in a radial direction from the clamp fastener cylinder, the clamp disc including an indentation at a radius beyond the radius of the spindle motor hub such that the clamp disc does not contact the spindle motor hub and wherein the indentation exerts a clamping force upon the members to secure the members to the rotatable housing.

18. The rotatable assembly of claim 17, wherein the clamp fastener cylinder is attached to the rotatable housing by complementary screw threads located in an interior surface of the rotatable housing and an exterior surface of the clamp fastener cylinder.

19. The rotatable assembly of claim 18, wherein the clamp fastener cylinder is characterized as comprising a torque driver hole to accommodate a torque driver tool for the application of torque to the clamp fastener during assembly.

20. The rotatable assembly of claim 17, wherein the clamp disc is characterized as a spring.

21. The rotatable assembly of claim 17, wherein the clamp fastener assembly includes a lip protruding from the clamp fastener assembly such that the clamp disc is fixed to the clamp fastener cylinder by the lip.

22. The rotatable assembly of claim 17, wherein the rotatable assembly comprises an actuator assembly.

23. The rotatable assembly of claim 17, wherein the rotatable assembly comprises a disc assembly.

24. The rotatable assembly of claim 17, wherein the clamp fastener cylinder allows access to the stationary shaft for attachment of disc drive hardware to the shaft.

25. An actuator assembly for a disc drive, comprising:

an actuator shaft;

an actuator shaft bearing housing mounted to the actuator shaft such that the actuator shaft bearing housing is capable of rotation around the actuator shaft;

a plurality of actuator arms coupled to the actuator shaft bearing housing such that the actuator shaft bearing housing is inserted into an opening in each of the actuator arms whereby the actuator arms are stacked around the actuator shaft bearing housing;

a clamp fastener cylinder coupled to the actuator shaft bearing housing by complementary screw threads located in the interior surface of the actuator shaft bearing housing and the exterior surface of the clamp fastener cylinder; and a clamp disc protruding in a radial direction from the clamp fastener cylinder such that the clamp disc protrudes beyond a diameter of the actuator shaft bearing housing and wherein an exterior surface of the clamp fastener cylinder is attached to an interior surface of the actuator shaft bearing housing sufficiently to exert a clamping force, via the clamp disc, onto the plurality of actuator arms, the clamping force holding the plurality of actuator arms against the actuator shaft housing, the clamp disc having a plurality of spanner holes such that torque is capable of being supplied to the clamp disc during assembly by way of a spanner tool.

26. A disc assembly for a disc drive, comprising:

a spindle motor;

a spindle motor hub mounted to the spindle motor such that the spindle motor hub is capable of rotation around the spindle motor;

a plurality of discs coupled to the spindle motor hub such that the spindle motor hub is inserted into an opening in each of the discs whereby the discs are axially stacked around the spindle motor hub;

a clamp fastener cylinder coupled to the spindle motor hub by complementary screw threads located in the interior surface of the spindle motor hub and the exterior surface of the clamp fastener cylinder; and a clamp disc protruding in a radial direction from the clamp fastener cylinder such that the clamp disc protrudes beyond a diameter of the spindle motor hub and wherein an exterior surface of the clamp fastener cylinder is attached to an interior surface of the spindle motor hub sufficiently to exert a clamping force, via the clamp disc, onto the plurality of discs, the clamping force holding the plurality of discs against the spindle motor hub, the clamp disc having a plurality of spanner holes such that torque is capable of being supplied to the clamp disc during assembly by way of a spanner tool.

27. A disc drive rotatable assembly, comprising:

a stationary shaft;

a rotatable housing mounted to the stationary shaft by way of bearing means, so that the rotatable housing is capable of rotation about the stationary shaft;

a plurality of radially extending members coupled to the rotatable housing such that the rotatable housing is inserted into an opening in each of the members whereby the members are stacked around the rotatable housing;

a clamp fastener coupled to the rotatable housing and the members, the clamp fastener comprising:

a clamp fastener cylinder coupled to the rotatable housing within the axial extent of the rotatable housing by complementary screw threads located in an interior surface of the rotatable housing and an exterior surface of the clamp fastener cylinder, the clamp fastener cylinder comprising a plurality of spanner holes to accommodate a spanner tool for the application of torque to the clamp fastener during assembly; and a clamp disc protruding in a radial direction from the clamp fastener cylinder such that the clamp disc protrudes beyond a diameter of the rotatable housing and exerts a clamping force upon the members to secure the members to the rotatable housing.

* * * * *